United States Patent [19]

Clark et al.

[11] Patent Number: 5,339,036
[45] Date of Patent: * Aug. 16, 1994

[54] LOGGING WHILE DRILLING APPARATUS WITH BLADE MOUNTED ELECTRODE FOR DETERMINING RESISTIVITY OF SURROUNDING FORMATION

[75] Inventors: Brian Clark, Missouri City; Stephen D. Bonner, Sugar Land; Jacques Jundt, Missouri City, all of Tex.; Martin Luling, Danbury, Conn.

[73] Assignee: Schlumberger Technology Corporation, Houston, Tex.

[*] Notice: The portion of the term of this patent subsequent to Apr. 6, 2010 has been disclaimed.

[21] Appl. No.: 65,276

[22] Filed: May 21, 1993

Related U.S. Application Data

[62] Division of Ser. No. 786,137, Oct. 31, 1991, Pat. No. 5,235,285.

[51] Int. Cl.$^5$ .................. G01V 3/18; G01V 3/38; E21B 47/12; E21B 49/00
[52] U.S. Cl. .................. 324/338; 324/369; 324/347; 324/342; 73/152; 175/50; 364/422
[58] Field of Search ............... 324/323, 338, 339, 343, 324/347, 342, 351, 355, 356, 366, 369, 371, 375; 73/151, 152; 181/102, 105; 175/40, 50; 364/422

[56] References Cited

U.S. PATENT DOCUMENTS

| | | | |
|---|---|---|---|
| 2,354,887 | 10/1942 | Silverman et al. | 177/352 |
| 3,186,222 | 6/1965 | Martin | 73/51 |
| 3,305,771 | 2/1967 | Arps . | |
| 3,408,561 | 10/1968 | Redwine et al. . | |
| 3,648,278 | 3/1972 | Miller | 324/323 X |
| 3,808,520 | 4/1974 | Runge | 324/343 |
| 3,967,201 | 6/1976 | Rorden | 340/855 |
| 4,355,357 | 10/1982 | Chan | 324/323 X |
| 4,553,097 | 11/1985 | Clark | 324/338 |
| 4,575,681 | 3/1986 | Grosso et al. | 324/367 |
| 4,578,675 | 3/1986 | MacLeod | 340/855 |
| 4,618,828 | 10/1986 | Raynal | 324/347 |
| 4,630,243 | 12/1986 | MacLeod | 367/82 |
| 4,725,837 | 2/1988 | Rubin | 340/855 |
| 4,736,300 | 4/1988 | Johnson, Jr. | 324/366 X |
| 4,739,325 | 4/1988 | MacLeod | 340/854 |
| 4,786,874 | 11/1988 | Grosso et al. | 324/369 |
| 4,839,644 | 6/1989 | Safinya et al. | 340/854 |
| 4,912,415 | 3/1990 | Sorensen | 324/369 X |
| 5,017,778 | 5/1991 | Wraight | 250/254 |
| 5,045,795 | 9/1991 | Gianzero et al. | 324/342 |
| 5,200,705 | 4/1993 | Clark et al. | 324/338 |
| 5,235,285 | 8/1993 | Clark et al. | 324/342 |

OTHER PUBLICATIONS

S. Gianzero et al., "A New Resistivity Tool for Measurement-While-Drilling", SPWLA Twenty-Sixth Annual Logging Symposium, Jun. 17-20, 1985.

S. Gianzero et al., "Determining the Invasion Near the Bit with the MWD Toroid Sonde", SPWLA Twenty-Seventh Annual Logging Symposium, pp. 1-17, Jun. 9-13, 1986.

T. I. F. Grupping et al., "Performance Update of a Dual-Resistivity MWD Tool with Some Promising Results in Oil Based Mud Applications", SPE 18115 pp. 73-85, Oct. 2-5, 1988 Houston, Tex.

T. I. F. Grupping et al., "Recent Performance of the Dual-Restitivity MWD Tool", SPE Formation Evaluation, pp. 171-176, Jun. 1991.

Primary Examiner—Gerard R. Strecker
Assistant Examiner—Warren S. Edmonds
Attorney, Agent, or Firm—Martin M. Novack; Wayne I. Kanak

[57] ABSTRACT

Measurement-while-drilling apparatus is disclosed for determining the resistivity of formations surrounding an earth borehole. An electrically conductive metal body, such as a drill collar on a drill string, is movable through the borehole. A transmitting toroidal coil antenna is disposed on the body and is energized to induce a current which travels in a path that includes the body and the formations. An electrode is disposed on the body, and an electrical signal resulting from said current is measured at the electrode to obtain an indication of the resistivity of the formations. In a disclosed embodiment, one or more electrodes can be mounted on a blade that is mechanically coupled to the body.

21 Claims, 12 Drawing Sheets

LOGGING WHILE DRILLING APPARATUS WITH BLADE MOUNTED ELECTRODE FOR DETERMINING RESISTIVITY OF SURROUNDING FORMATION

This is a divisional of copending U.S. application Ser. No. 786,137 filed Oct. 31, 1991, now U.S. Pat. No. 5,235,285.

RELATED APPLICATIONS

The present application is generally related to copending U.S. patent application Ser. No. 786,138 (now U.S. Pat. No. 5,200,705) and Ser. No. 786,199 (now abandoned, both filed Oct. 31, 1991, and both assigned to the same assignee as the present application.

FIELD OF THE INVENTION

This invention relates to the field of well logging and, more particularly, to well logging apparatus for determining earth formation resistivity and sending the information to the earth's surface. A form of the invention has general application to the well logging art, but the invention is particularly useful for logging-while-drilling (also called measurement-while-drilling).

BACKGROUND OF THE INVENTION

Resistivity logging, which measures the electrical resistivity of formations surrounding an earth borehole, is a commonly used technique of formation evaluation. For example, porous formations having high resistivity generally indicate the presence of hydrocarbons, while porous formations having low resistivity are generally water saturated. In so-called "wireline" well logging, wherein measurements are taken in a well bore (with the drill string removed) by lowering a logging device in the well bore on a wireline cable and taking measurements with the device as the cable is withdrawn, there are several techniques of resistivity logging which use elements such as electrodes or coils. Various arrangements of electrodes, on the logging device and at the earth's surface, have been utilized to measure electrical currents and/or potentials from which formation resistivity can be derived. For example, button electrodes have been employed on a pad which is urged against the borehole wall. These electrodes have been used to obtain azimuthal resistivity measurements, and focusing techniques have been employed to obtain resistivity measurements that have substantial lateral extent into the formations and provide relatively high vertical resolution resistivity information.

Various techniques for measuring resistivity while drilling have also been utilized or proposed. Techniques employed in wireline logging may or may not be adaptable for use in a measurement-while-drilling equipment. The borehole presents a difficult environment, even for wireline logging, but the environment near the well bottom during drilling is particularly hostile to measuring equipment. For logging-while-drilling applications, the measuring devices are housed in heavy steel drill collars, the mechanical integrity of which cannot be compromised. Measurement approaches which require a substantial surface area of electrically insulating material on the surface of a drill collar housing are considered impractical, since the insulating material will likely be damaged or destroyed. This is particularly true for measuring structures that would attempt to attain intimate contact with the newly drilled borehole wall as the drill string continues its rotation and penetration, with the attendant abrasion and other stresses.

One resistivity measuring approach is to utilize a plurality of toroidal coil antennas, spaced apart, that are mounted in insulating media around a drill collar or recessed regions thereof. A transmitting antenna of this nature radiates electromagnetic energy having a dominant transverse magnetic component, and can use the electrically conductive body of the drill collar to good advantage, as described next.

In U.S. Pat. No. 3,408,561 there is disclosed a logging-while-drilling system wherein a receiving toroidal coil is mounted in a recess on a drill collar near the drill bit and a transmitting toroidal coil is mounted on the drill collar above the receiver coil. The drill collar serves as part of a one-turn "secondary winding" for the toroidal antennas, the remainder of such "secondary winding" including a current return path through the mud and formations. The voltage induced in the receiver toroidal coil provides an indication of the resistivity of formations around the drill bit. U.S. Pat. No. 3,305,771 utilizes a similar principle, but employs a pair of spaced-apart transmitting toroidal coils and a pair of spaced-apart receiving toroidal coils between the transmitting toroidal coils.

As generally described in the prior art, a transmitter toroidal coil mounted on a drill collar induces current in the drill collar which can be envisioned as leaving the drill collar, entering the formations below the transmitter coil, and returning to the drill string above the transmitter coil. Since the drill collar below the transmitter coil is substantially an equipotential surface, a portion of the current measured by a lower receiver toroidal coil mounted near the drill bit tends to be laterally focused. This can provide a "lateral" resistivity measurement of formations adjacent the drill collar. Also, a portion of current leaving the drill stem below the receiver coil (mostly where the bit contacts the formations) provides a "bit resistivity" measurement; that is, a measurement of the resistivity of the formations instantaneously being cut by the bit. [See, for example, the above-identified U.S. Pat. Nos. 3,408,561 and 3,305,771, and publications entitled "A New Resistivity Tool For Measurement While Drilling", SPWLA Twenty-Sixth Annual Logging Symposium (1985) and "Determining The Invasion Near The Bit With The MWD Toroid Sonde", SPWLA Twenty-Seventh Annual Logging Symposium (1986).] Thus, the prior art indicates that a measurement-while-drilling logging device using toroidal coil transmitting and receiving antennas can be employed to obtain lateral resistivity measurements and/or bit resistivity measurements.

Reference can also be made to the following which relate to measurement-while-drilling using electrodes and other transducers: U.S. Pat. No. 4,786,874, U.S. Pat. No. 5,017,778, and copending U.S. patent application Ser. No. 525,268, filed May 16, 1990, now U.S. Pat. No. 5,130,950, assigned to the same assignee as the present application.

Resistivity measurements obtained using transmitting and receiving toroidal coils on a conductive metal body are useful, particularly in logging-while-drilling applications, but it would be desirable to obtain measurements which can provide further information concerning the downhole formations; for example, lateral resistivity information having improved vertical resolution, azimuthal resistivity information, and multiple depths of investigation for such resistivity information. It is among the objects of the present invention to devise equipment which can provide such further resistivity measurement information.

In logging-while-drilling applications, various schemes have been proposed for transmitting the measurement information to the surface of the earth. A number of these schemes involve using a toroidal coil antenna to radiate electromagnetic energy having a transverse magnetic component from downhole to the earth's surface, or to repeaters along the drill string which receive, boost, and re-transmit the signals using further toroidal coil transmitters. As in the systems first described above which utilize toroidal coils for obtainment of resistivity measurements, the drill string is used as a current carrier. Reference can be made, for example, to U.S. Pat. Nos. 3,186,222, 3,967,201, 4,578,675, 4,725,837, 4,739,325, and 4,839,644. In the U.S. Pat. No. 4,578,675 there is disclosed a logging-while-drilling apparatus which utilizes toroidal coil antennas to obtain bottom-hole resistivity measurements and employs one of these antennas, on a time-sharing basis, for two-way communication with equipment at the surface of the earth. The communication may be via passive or active repeater units further uphole. In general, downhole/surface electromagnetic telemetry approaches which use the drill string as a current carrying component (and, typically, the mud and the formations as a return current path) have intrinsic limitations. The mud conductivity and the conductivity and heterogeneity of the surrounding formations will affect the signal, and the need for boosters or repeaters is inconvenient and expensive.

For various reasons, the approach that has been the most successful for logging-while-drilling communication between the well bottom and the earth's surface has been so-called mud pulse telemetry. Briefly, pressure pulses (or acoustic pulses) modulated with the information to be conveyed, are applied to the mud column [typically downhole, for communication to the surface, although two-way communication is also used], and received and demodulated uphole.

A downhole mud telemetry subassembly typically includes the equipment for controlling data communication with the surface and for applying modulated acoustic pulses to the mud. When a measurement subassembly (e.g. one measuring formation parameters and/or other parameters concerning drilling such as downhole weight on bit or direction and inclination of the borehole) is housed in a drill collar that is mounted adjacent the downhole mud telemetry subassembly, a wiring connector can be provided for electronic connection between these subassemblies. The nature of the drill collar sections housing these units, the typical threaded mechanical connections therebetween, and the stresses to which the connections are subjected, render the connection of wires somewhat inconvenient, but such connections are commonly implemented. A larger problem arises, however, when a desired bottom hole arrangement of telemetry equipment, measurement collars, stabilizer collars, etc. involves separation between the mud telemetry subassembly and one or more measurement subassemblies that are intended to communicate therewith. Under such circumstance, wiring buses and connectors may be provided for local electronic communication between the measurement subassembly and the downhole mud telemetry subassembly, but the requirement for crossing other drill collar sections and joints is disadvantageous. The problem is exacerbated when the relative placements of a particular measurement subassembly (or subassemblies) with respect to the downhole mud telemetry subassembly is not known a-priori and is decided spontaneously at the well site, as is often the case in modern drilling operations.

It is therefore among the further objects of the present invention to provide improvement in the efficiency and flexibility of communications in logging-while-drilling systems.

SUMMARY OF THE INVENTION

A form of the present invention utilizes a toroidal coil antenna mounted, in an insulating medium, on a drill collar to induce a current which travels in a path that includes the drill collar and earth formations around the drill collar. As is generally known in the art, one or more toroidal coil receiving antennas can be mounted, in an insulating medium, on the drill collar to obtain the types of measurements described in the Background hereof. A form of the present invention expands on the toroid-to-toroid type of measurement to obtain further useful information about the downhole formations. In accordance with a feature of the present invention, at least one electrode is provided on the drill collar and is utilized to detect currents transmitted by the transmitter toroidal coil which return via the formations to the electrode(s) laterally; that is, approximately normal to the axis of the drill collar. The electrodes preferably have a relatively small vertical extent, and the measurements taken with these electrodes are useful in obtaining formation resistivity with relatively high vertical resolution, as well as relatively high depth of investigation for the resolution provided. The electrodes can also provide azimuthal resistivity information. Thus, resistivity logging measurements are obtained that can supplement or replace resistivity measurements obtained with toroidal coil receiving antenna(s). The electrode(s) can be mounted in a drill collar or, in accordance with a feature hereof, on a stabilizer blade attached to or integral with the drill collar. In an embodiment hereof, button-type electrode(s) are utilized, as well as a ring-type of electrode.

In accordance with an embodiment of the invention, an apparatus is disclosed for determining the resistivity of formations surrounding an earth borehole. [In the present application, any references to the determination or use of resistivity are intended to generically mean conductivity as well, and vice versa. These quantities are reciprocals, and mention of one or the other herein is for convenience of description, and not intended in a limiting sense.] An electrically conductive metal body is movable through the borehole. A toroidal coil antenna is disposed on the body. [Throughout the present application "disposed on" and "disposed in" are both intended to generically include "disposed on or in", and "mounted on" and "mounted in" are both intended to generically include "mounted on or in".] Means are provided for energizing the transmitting toroidal coil antenna to induce a current which travels in a path that includes the body and the formations. An electrode is disposed on the body, and means are provided for measuring the electrical effect of the current on the electrode, said electrical effect being an indication of the resistivity of the formations. In the preferred embodiment of the invention, the means for measuring the electrical effect on the electrode comprises means for measuring the current flow in the electrode. Also in this embodiment, the electrode is electrically coupled to said body, either directly or via circuitry used to measure the current flow in the electrode, and the surface of said electrode is electrically isolated from the surface of said body.

In accordance with a further form of the invention, advantages in the efficiency and flexibility of communication are attained by utilizing both electromagnetic transmission and acoustic transmission in communicating information between bottom hole subassemblies and the earth's surface. Local downhole electromagnetic communication (e.g. toroid-to-toroid), e.g. between several sections of drill collar, is an effective means of communication over a relatively short distance, and the need for hard wiring communication between bottom hole subassemblies is reduced or eliminated, while reliable acoustic communication with the earth's surface is retained. This is particularly advantageous in situations where a measurement subassembly is non-adjacent to the surface communications subassembly in a bottom hole arrangement, or where the relative placements of these subassemblies in the bottom hole arrangement are not known a priori.

In accordance with an embodiment of a form of the invention, a first subassembly is mountable in the drill string near the bit, the first subassembly including: a first electrically conductive body; means disposed in the first body for measuring a physical parameter relating to said drilling; a first toroidal coil antenna disposed on the first body; and means for generating a local communication signal which depends on said measured physical parameter, and for coupling said local communication signal to said first toroidal coil antenna. [As used herein a physical parameter relating to the drilling is intended to generically include measurements of the properties of formations near the drill bit and measurements relating to the drilling operation and the drill bit itself.] A second subassembly is mountable in the drill string, the second subassembly including: a second electrically conductive body; a second toroidal coil antenna disposed on the second body; means coupled with the second toroidal coil antenna for receiving said local communication signal and generating a surface communication signal which depends on said local communication signal; and an acoustic transmitter for transmitting an acoustic surface communication signal. An acoustic receiver is provided at the earth's surface for receiving the acoustic surface communication signal.

Further features and advantages of the invention will become more readily apparent from the following detailed description when taken in conjunction with the accompanying drawings.

DETAILED DESCRIPTION

Figure 1:
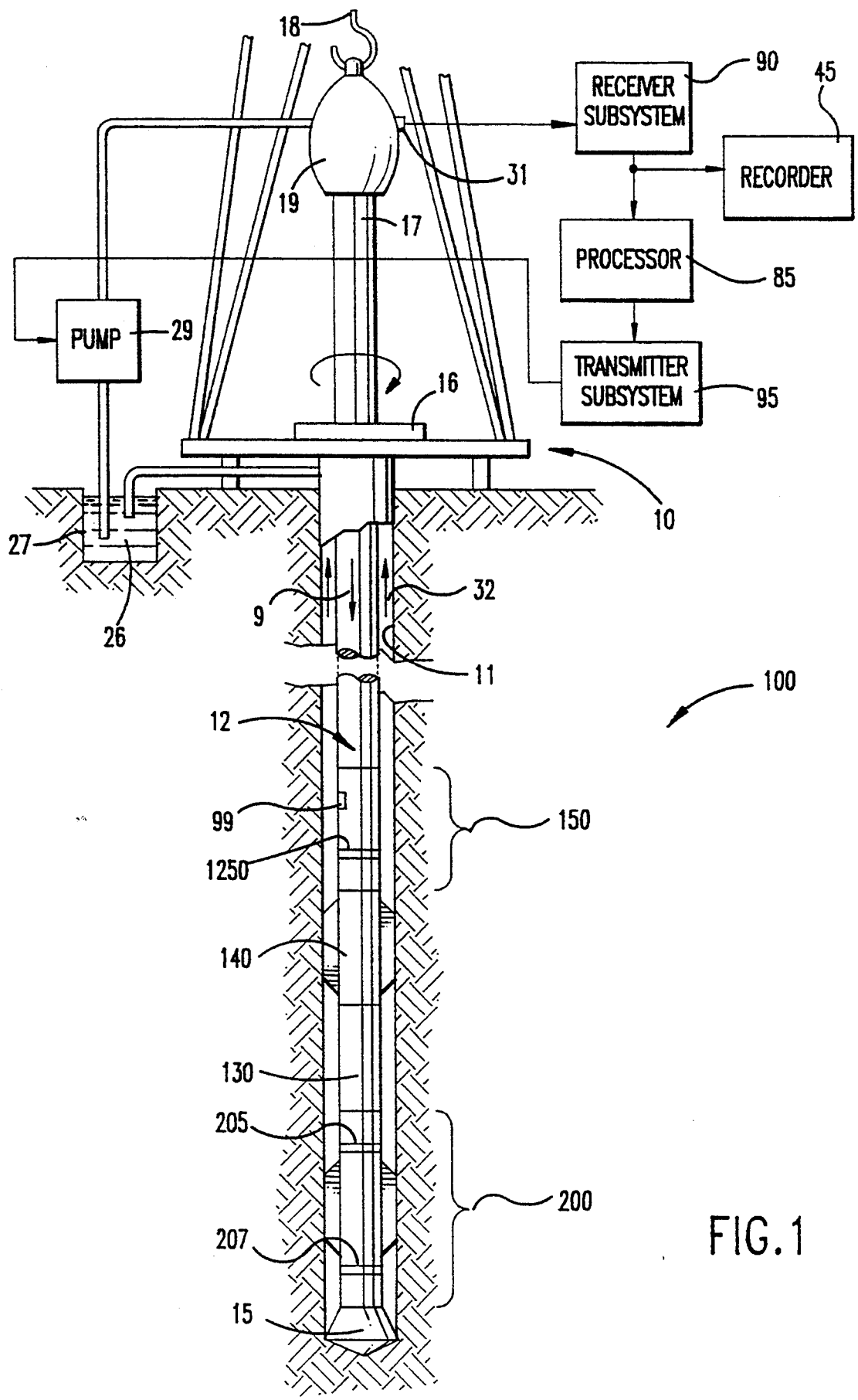
FIG. 1 is a schematic diagram, partially in block form, of a logging-while-drilling apparatus in accordance with an embodiment of the invention, shown attached to a drill string that is suspended in a borehole by a conventional drilling rig.

Referring to FIG. 1, there is illustrated an embodiment of the invention in the form of a measuring-while-drilling apparatus. [As used herein, and unless otherwise specified, measurement-while-drilling (also called measuring-while-drilling or logging-while-drilling) is intended to include the taking of measurements in an earth borehole, with the drill bit and at least some of the drill string in the borehole, during drilling, pausing, and/or tripping.] A platform and derrick 10 are positioned over a borehole 11 that is formed in the earth by rotary drilling. A drill string 12 is suspended within the borehole and includes a drill bit 15 at its lower end. The drill string 12 and the drill bit 15 attached thereto are rotated by a rotating table 16 (energized by means not shown) which engages a kelly 17 at the upper end of the drill string. The drill string is suspended from a hook 18 attached to a travelling block (not shown). The kelly is connected to the hook through a rotary swivel 19 which permits rotation of the drill string relative to the hook. Alternatively, the drill string 12 and drill bit 15 may be rotated from the surface by a "top drive" type of drilling rig. Drilling fluid or mud 26 is contained in a pit 27 in the earth. A pump 29 pumps the drilling fluid into the drill string via a port in the swivel 19 to flow downward (arrow 9) through the center of drill string 12. The drilling fluid exits the drill string via ports in the drill bit 15 and then circulates upward in the region between the outside of the drill string and the periphery of the borehole, commonly referred to as the annulus, as indicated by the flow arrows 32. The drilling fluid thereby lubricates the bit and carries formation cuttings to the surface of the earth. The drilling fluid is returned to the pit 27 for recirculation. An optional directional drilling assembly (not shown) with a mud motor having a bent housing or an offset sub could also be employed.

Mounted within the drill string 12, preferably near the drill bit 15, is a bottom hole assembly, generally referred to by reference numeral 100, which includes capabilities for measuring, processing, and storing information, and communicating with the earth's surface. [As used herein, near the drill bit means within several drill collar lengths from the drill bit.] The assembly 100 includes a measuring and local communications apparatus 200 which is described further hereinbelow. In the example of the illustrated bottom hole arrangement, a drill collar 130 and a stabilizer collar 140 are shown successively above the apparatus 200. The collar 130 may be, for example, a pony collar or a collar housing measuring apparatus which performs measurement functions other than those described herein. The need for or desirability of a stabilizer collar such as 140 will depend on drilling parameters. Located above stabilizer collar 140 is a surface/local communications subassembly 150. The subassembly 150, described in further detail hereinbelow, includes a toroidal antenna 1250 used for local communication with the apparatus 200, and a known type of acoustic communication system that communicates with a similar system at the earth's surface via signals carried in the drilling fluid or mud. The surface communication system in subassembly 150 includes an acoustic transmitter which generates an acoustic signal in the drilling fluid that is typically representative of measured downhole parameters. One suitable type of acoustic transmitter employs a device known as a "mud siren" which includes a slotted stator and a slotted rotor that rotates and repeatedly interrupts the flow of drilling fluid to establish a desired acoustic wave signal in the drilling fluid. The driving electronics in subassembly 150 may include a suitable modulator, such as a phase shift keying (PSK) modulator, which conventionally produces driving signals for application to the mud transmitter. These driving signals can be used to apply appropriate modulation to the mud siren. The generated acoustic mud wave travels upward in the fluid through the center of the drill string at the speed of sound in the fluid. The acoustic wave is received at the surface of the earth by transducers represented by reference numeral 31. The transducers, which are, for example, piezoelectric transducers, convert the received acoustic signals to electronic signals. The output of the transducers 31 is coupled to the uphole receiving subsystem 90 which is operative to demodulate the transmitted signals, which can then be coupled to processor 85 and recorder 45. An uphole transmitting subsystem 95 is also provided, and can control interruption of the operation of pump 29 in a manner which is detectable by the transducers in the subassembly 150 (represented at 99), so that there is two way communication between the subassembly 150 and the uphole equipment. In existing systems, downward communication is provided by cycling the pump(s) 29 on and off in a predetermined pattern, and sensing this condition downhole. This or other technique of uphole-to-downhole communication can be utilized in conjunction with the features disclosed herein. The subsystem 150 may also conventionally include acquisition and processor electronics comprising a microprocessor system (with associated memory, clock and timing circuitry, and interface circuitry) capable of storing data from a measuring apparatus, processing the data and storing the results, and coupling any desired portion of the information it contains to the transmitter control and driving electronics for transmission to the surface. A battery may provide downhole power for this subassembly. As known in the art, a downhole generator (not shown) such as a so-called "mud turbine" powered by the drilling fluid, can also be utilized to provide power, for immediate use or battery recharging, during drilling. It will be understood that alternative acoustic or other techniques can be employed for communication with the surface of the earth.

Figure 2:
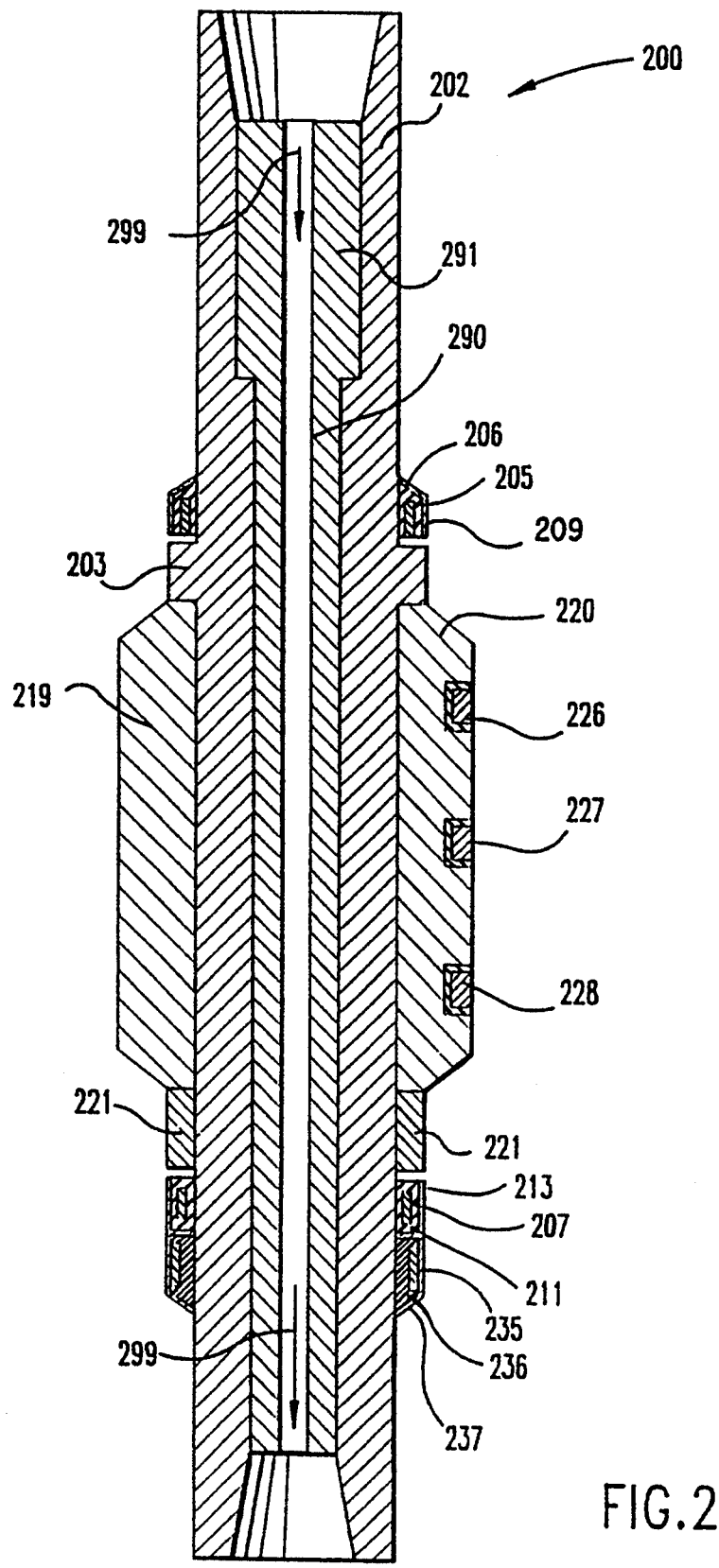
FIG. 2 is a cross-sectional view of a measuring and local communications subassembly in accordance with an embodiment of the invention.

As seen in FIG. 2, the subsystem 200 includes a section of tubular drill collar 202 having mounted thereon a transmitting antenna 205, a receiving antenna 207, and receiving electrodes 226, 227, 228 and 235. In the present embodiment the transmitting antenna 205 comprises a toroidal antenna (see also FIG. 3) having coil turns wound on a ferromagnetic toroidal core that is axially coincident with the axis of the drill collar 202. The core may have a circular or rectangular cross-section, although other shapes can be used. The receiving electrodes 226, 227 and 228 are button electrodes preferably mounted in a stabilizer 220, and electrode 235 is a ring electrode. The receiving antenna 207 is another toroidal coil antenna.

Figure 3:
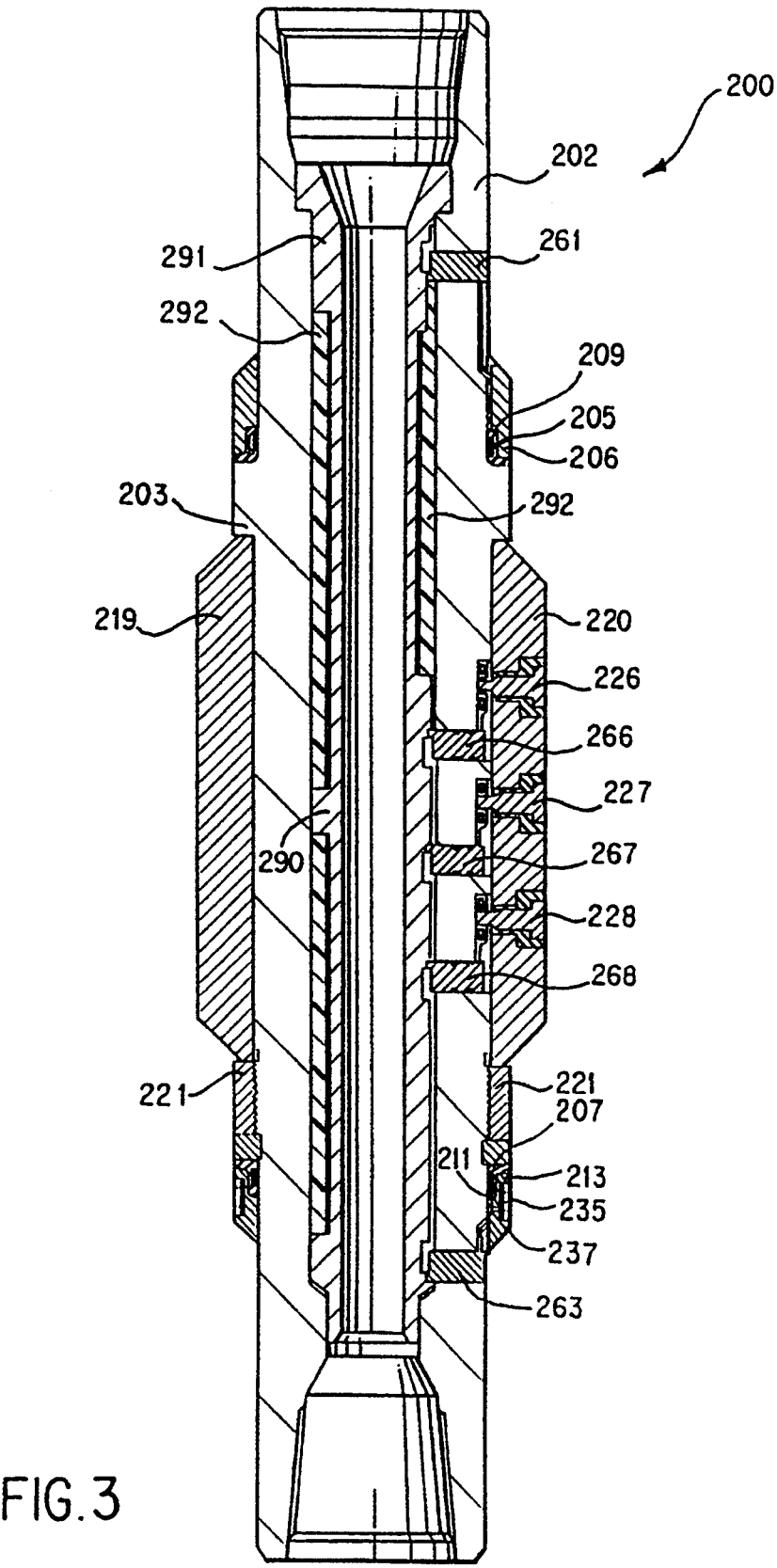
FIG. 3 is a cross-sectional view of the subassembly of FIG. 2, in greater detail.

Referring now also to FIG. 3 as well as FIG. 2, there are illustrated further details of the structure of the measurement and communication subsystem 200 that is housed in the drill collar 202. An annular chassis 290, which contains most of the electronics, fits within the drill collar 202. In this embodiment the drilling mud path is through the center of the chassis, as illustrated by arrows 299 (FIG. 2). The chassis 290 has a number of slots, such as for containment of batteries (at position 291, see FIG. 2) and circuit boards 292. In the disclosed embodiment, the circuit boards are in the form of elongated thin strips, and can accordingly be planar, it being understood that other circuit board configurations or circuit packaging can be utilized. The transmitting toroidal antenna 205 [which can also be utilized in a communications mode as a receiver in the present embodiment] is supported in a suitable insulating medium, such as Viton rubber 206. The assembled coil, in the insulating medium, is mounted on the collar 202 in a subassembly which includes a protective tapered metal ring 209, that is secured to the collar surface by bolts. The antenna wiring, and other wiring, is coupled to the annular circuit assembly via bulkhead feed-throughs, as represented at 261 (for wiring to antenna 205), 266, 267, 268 (for wiring to electrodes 226, 227 and 228, respectively), and 263 (for wiring to electrode 235 and antenna 207). The receiving toroidal coil antenna 207 is constructed in generally the same way, although with more coil turns in the present embodiment, in insulating medium 211, and with protective ring 213. The receiving ring electrode 235 is also mounted in an insulating medium such as a fiberglass-epoxy composite 236, and is held in a subassembly that includes tapered ring 237, which can be integrated with the protective ring for the receiving antenna 207.

Figure 4:
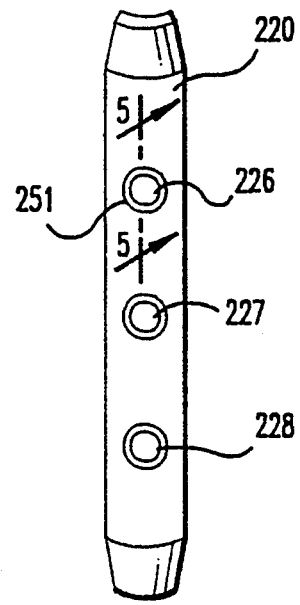
FIG. 4 is a front view of a stabilizer blade, with electrodes mounted therein, in accordance with an embodiment of the invention.

The three button electrodes 226, 227 and 228 are provided in stabilizer blade 220 which may have, for example, a typical straight or curved configuration. Two of four (or three) straight stabilizer blades 219 and 220 are visible in FIGS. 2 and 3. The stabilizer blades are formed of steel, integral with a steel cylindrical sleeve that slides onto the drill collar 202 and abuts a shoulder 203 formed on the drill collar, and may have the type of keyed-on construction described in the above-referenced copending U.S. patent application Ser. No. 786,199, now abandoned incorporated herein by reference. The stabilizer is secured to collar 202 with lock nuts 221. The blades are conventionally provided with hard facing surfaces, e.g. of tungsten carbide. The button electrode faces have generally round (in this case, circular) peripheries which will be generally adjacent the borehole wall. The button faces can have generally cylindrical curvatures to conform to the stabilizer surface or can have flat faces with surfaces that are slightly recessed from the stabilizer surface shape. These electrodes span only a small fraction of the total circumferential locus of the borehole and provide azimuthal resistivity measurements. Also, these electrodes have a vertical extent that is a small fraction of the vertical dimension of the stabilizer on which they are mounted, and provide relatively high vertical resolution resistivity measurements. In the illustrated embodiment, the surfaces of electrodes 226, 227 and 228 have diameters of about 1 inch (about 2.5 cm.), which is large enough to provide sufficient signal, and small enough to provide the desired vertical and azimuthal measurement resolution. Preferably, the electrode periphery, which can also be oval, should be contained within a circular region that is less than about 1.5 inches (about 3.8 cm.) in diameter. In the present embodiment, the top portion of each electrode is surrounded by an insulating medium, such as Viton rubber, which isolates the electrode surface from the surface of the stabilizer blade 220. A fiberglass epoxy composite can be used around the base of the electrode. The electrodes 226, 227 and 228 (see also FIG. 4) provide a return path from the formations to the collar 202 (of course, when the AC potential reverses the current path will also reverse), and the current is measured to determine lateral resistivity of the region of the formation generally opposing the electrode. The electrodes 227 and 228 are respectively further from the transmitter than the electrode 226, and will be expected to provide resistivity measurements that tend to be respectively deeper than the measurement obtained from electrode 226. The electrodes are mounted in apertures in the stabilizer 220 that align with apertures in the drill collar 202 to facilitate coupling of the electrodes to circuitry in the annular chassis 290.

Figure 5:
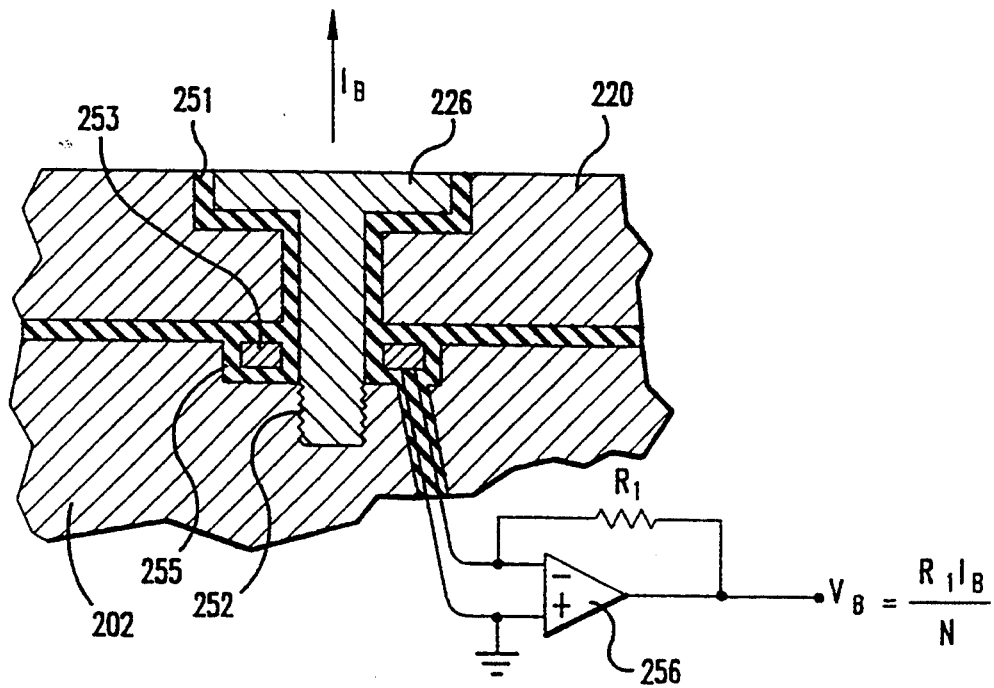
FIG. 5 is a cross-sectional view, as taken through a section defined by section line 5—5 of FIG. 4, of an embodiment of an electrode in accordance with a form of the invention.
Figure 6:
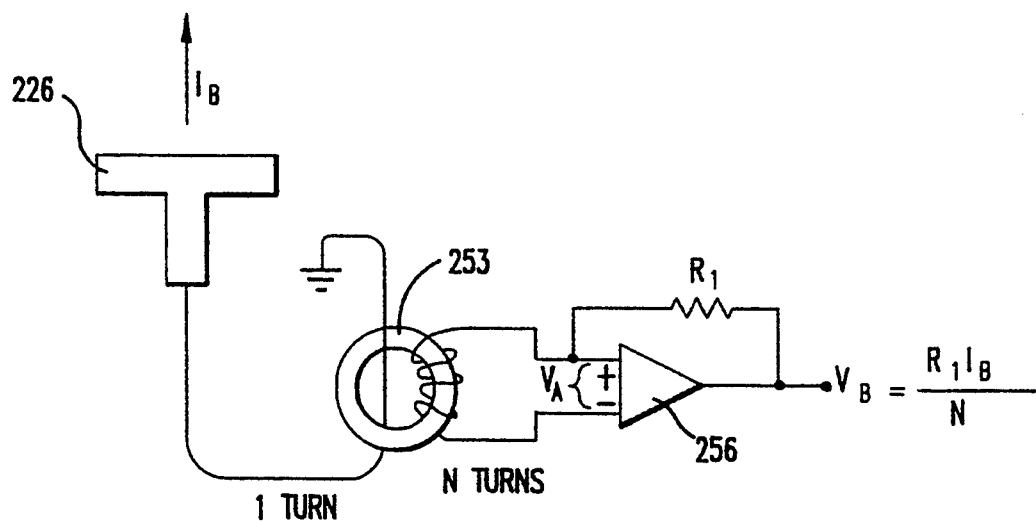
FIG. 6 is a schematic diagram of an equivalent circuit of the FIG. 5 embodiment.

In one electrode configuration, the electrode body is directly mounted, in the manner of a "stud", in the stabilizer body. As seen in FIG. 5 (and also in FIG. 3), the metal button electrode (226, for example) is mounted in an insulating medium 251, such as Viton rubber, and its neck portion engages threading 252 in collar 202. A small toroidal coil 253 is seated in an insulating medium 255, which can also be Viton rubber, in a circular recess in the collar surface. The toroidal coil 253 is used to sense current flow in the electrode 226. The leads from coil 253 pass through a bulkhead feed-through (see FIG. 3) to circuitry shown in FIG. 5. In particular, one conductor from the current sensing toroidal coil 253 is coupled to the inverting input of an operational amplifier 256. The other conductor from toroidal coil 253, and the non-inverting input of operational amplifier 256, are coupled to ground reference potential; e.g. the body of drill collar 202. A feedback resistor $R_1$ is provided between the output and the inverting input of operational amplifier 256. The circuit equivalent is illustrated in FIG. 6 which shows the button electrode stud as a single turn through the core of toroidal coil 253, the number of turns in the coil being N. The gain of operational amplifier 256 is very high, and $V_A$, the voltage difference between the inverting and non-inverting input terminals is very small, virtually zero. The input impedance of the operational amplifier is very high, and essentially no current flows into either input terminal. Thus, if the current flow in the electrode 226 is $I_B$, and the current flow in the toroidal coil "secondary" is $I_B/N$, the current $I_B/N$ flows through the feedback resistor $R_1$, making the amplifier output voltage $R_1 I_B/N$.

Figure 7:
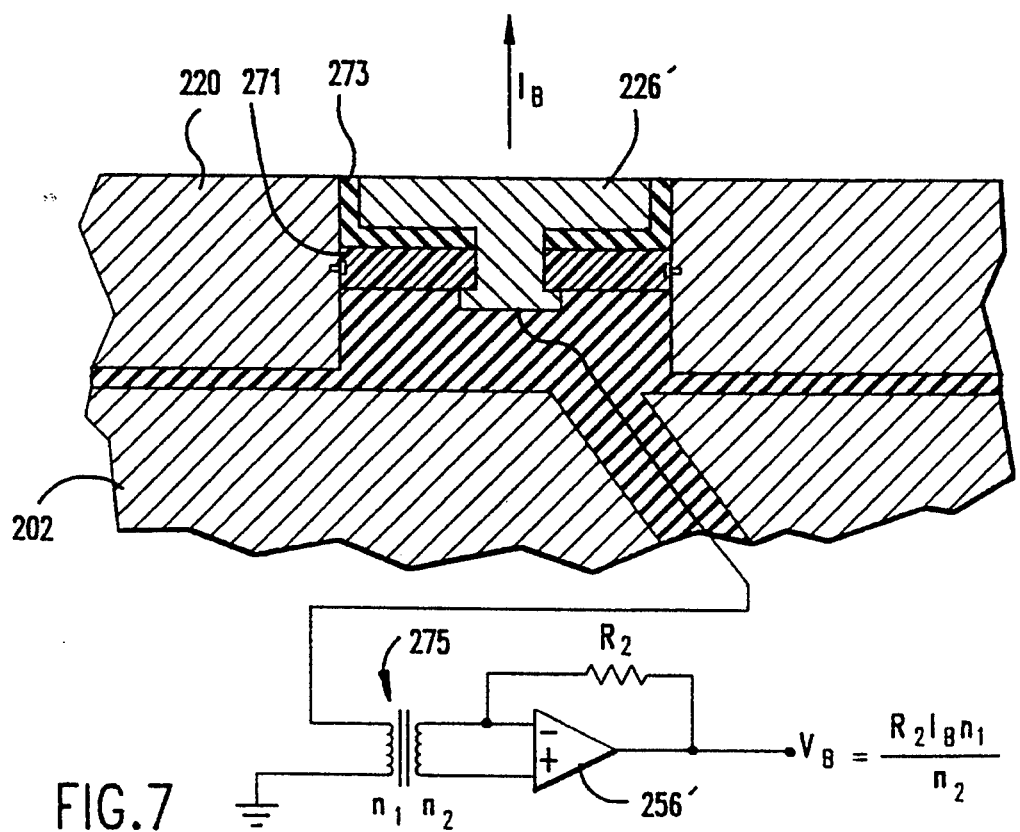
FIG. 7 is a cross-sectional view, partially in schematic form, of an embodiment of an electrode and associated circuitry in accordance with a further form of the invention.

Referring to FIG. 7, there is shown a diagram of a further embodiment of a button electrode that can be utilized in a form of the present invention. In this embodiment, the electrode body (e.g. 226') is supported on an insulating mounting frame 271 formed of a material such as epoxy fiberglass composite, and is sealed with Viton rubber insulating material 273. The electrode is coupled, via a bulkhead feed-through, to one end of the primary coil of a transformer 275, the other end of which is coupled to ground reference potential (e.g., the collar body). The secondary winding of transformer 275 is coupled to the inputs of an operational amplifier 256' which operates in a manner similar to the operational amplifier 256 of FIGS. 5 and 6. A feedback resistor $R_2$ is coupled between the output of the operational amplifier 256' and its inverting input, and the output is designated $V_B$. Derivation of the output voltage as a function of the electrode current $I_B$ is similar to that of the circuit of FIG. 6, except that in this case the turns ratio, secondary to primary, is $n_2/n_1$, and the expression for the output voltage is $V_B = R_2 I_B n_1/n_2$. An advantage of this electrode arrangement and circuit is that $n_1$ can be increased to increase the output voltage sensitivity to the current being measured. Reference can also be made to the above-referenced copending U.S. patent application Ser. No. 786,138, now U.S. Pat. No. 5,200,705, incorporated herein by reference.

Figure 8:
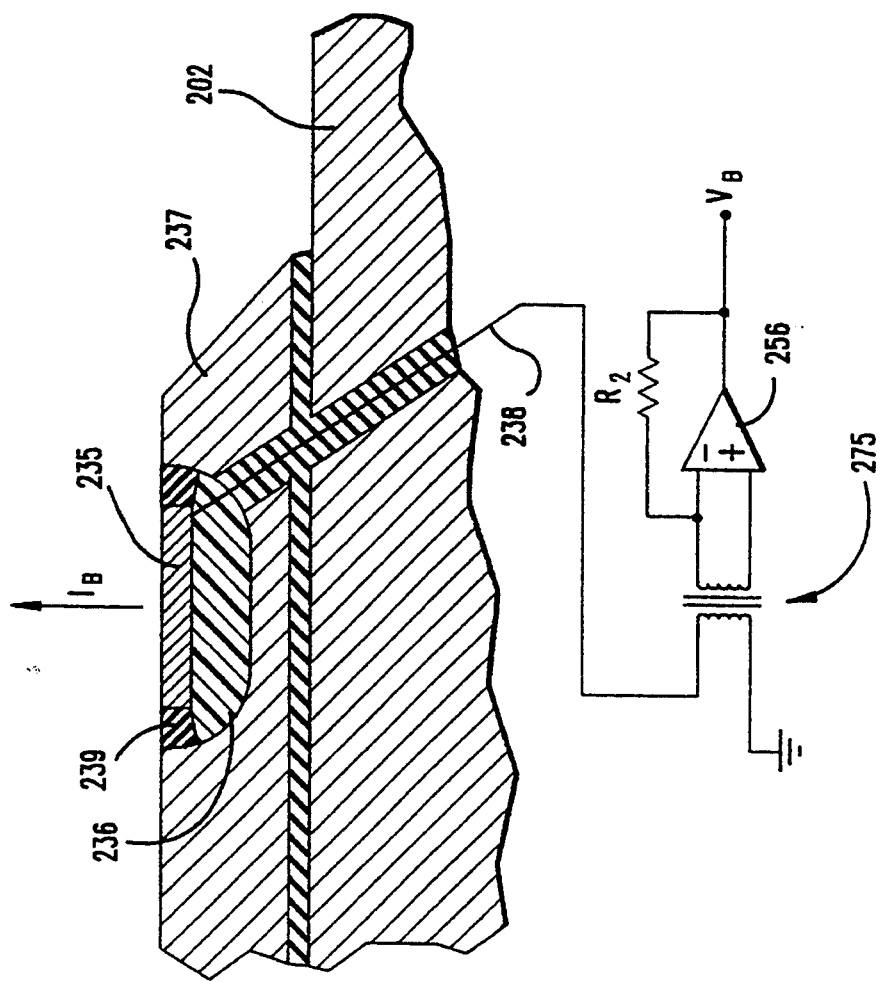
FIG. 8 is a cross-sectional view of an embodiment of a ring electrode used in a form of the invention.

FIG. 8 illustrates an embodiment of the ring electrode 235 utilized in the embodiment of FIG. 2. The ring electrode, which can be welded into a single piece, is seated on fiberglass-epoxy insulator 236, and is sealed with viton rubber 239. A conductor 238 that can be brazed or welded to the ring electrode 235, is coupled, via a feed-through, to circuitry similar to that of FIG. 7, with a transformer 275, an operational amplifier 256, a feedback resistor $R_2$, and an output $V_B$. The current sensing operation of this circuit is substantially the same as that of the FIG. 7 circuit.

The apparent resistivity of the formation is inversely proportional to the current I measured at the electrode. If the voltage at the electrode relative to the voltage of the drill collar surface above the toroidal coil transmitter coil 205 is V, the apparent resistivity is $R_{app} = kV/I$, where k is a constant that can be determined empirically or by modeling. If desired, a correction can be applied to compensate for electromagnetic skin effect.

Figure 9:
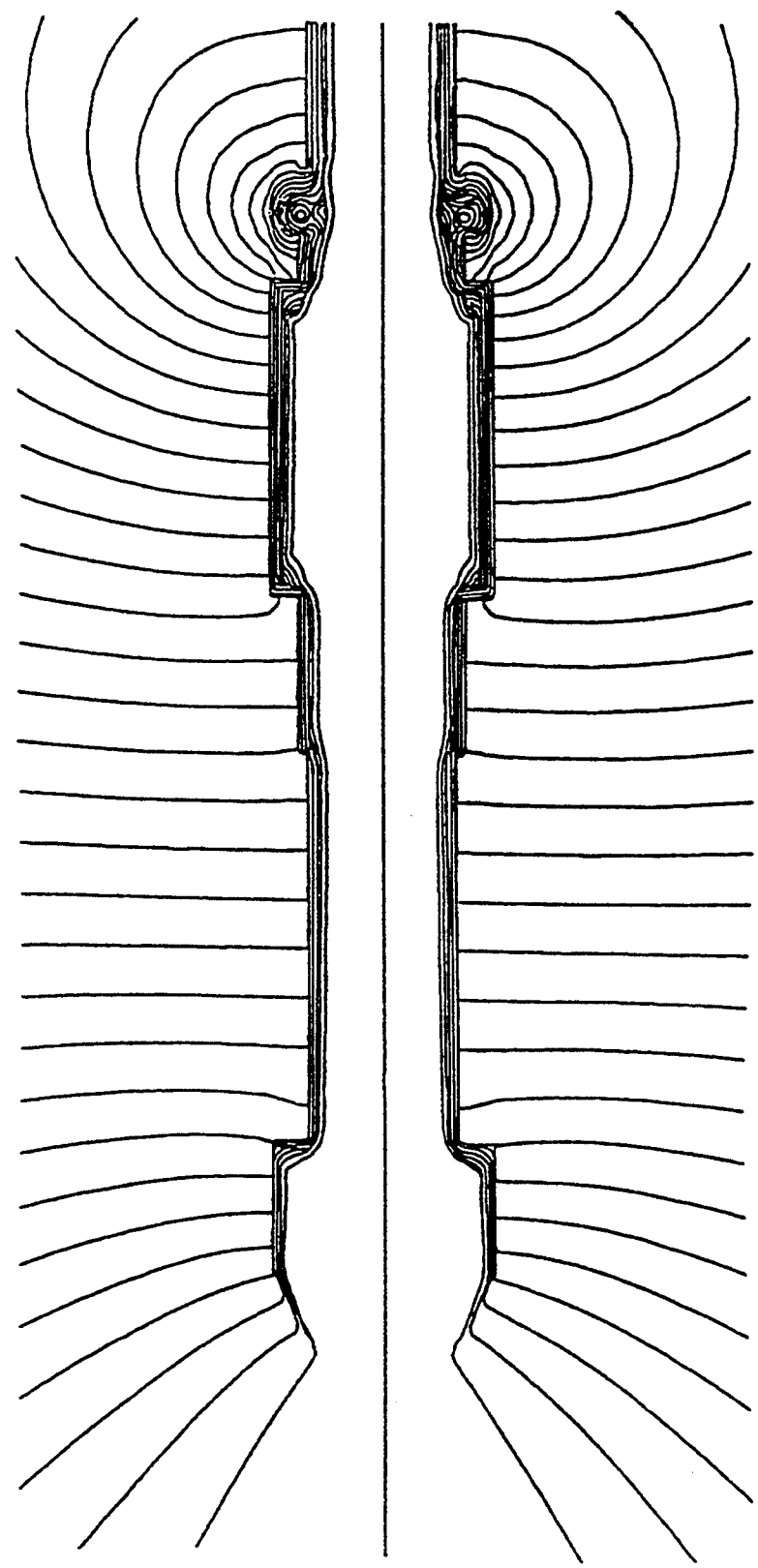
FIG. 9 is a representation of the type of current pattern obtained when the transmitting toroidal coil of FIG. 2 is energized.

Referring to FIG. 9, there is shown a general representation of the known type of current pattern that results from energizing the transmitter toroidal coil in a well being drilled with mud having substantial conductivity. The pattern will, of course, depend on the formations' bed pattern and conductivities, the example in FIG. 9 being for the simplified case of uniform conductivity.

Figure 10:
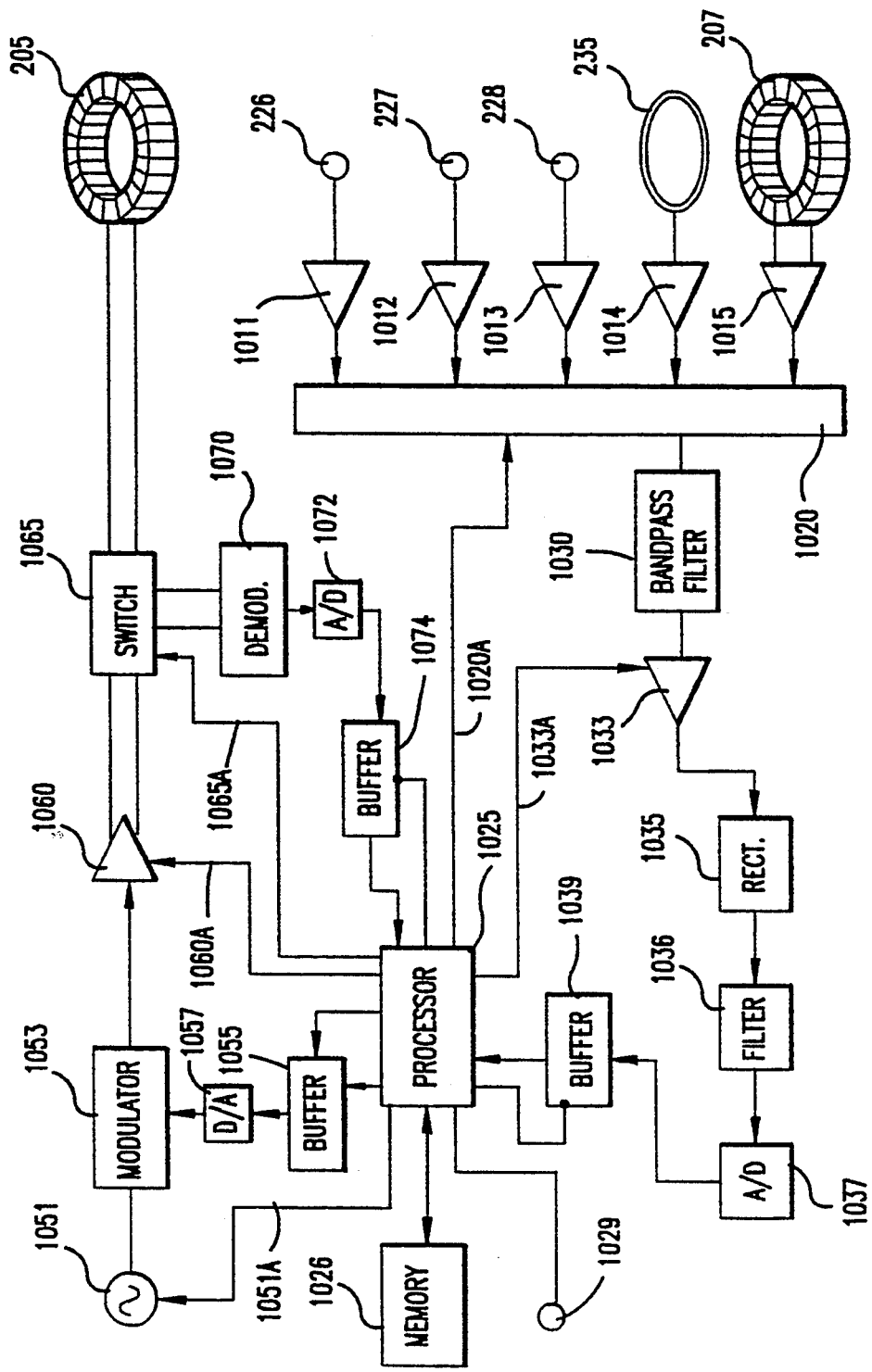
FIG. 10 is a block diagram, partially in schematic form, of the antennas, electrodes, and circuitry utilized in an embodiment of the invention.

FIG. 10 shows a block diagram of an embodiment of downhole circuitry in subassembly 200 for implementing measurements and/or for transmitting information to the surface/local communications subassembly 150. The button electrodes 226, 227 and 228 and ring electrode 235 are each coupled, via the previously described sensing and amplification circuits (e.g. FIGS. 5-8, now referred to by reference numerals 1011-1014, respectively), to a multiplexer 1020. The output of the receiver toroidal coil 207 is also coupled, via a sensing and amplification circuit 1015, to the multiplexer 1020. The multiplexer 1020 is under control of a computer or processor 1025, as represented by the line 1020A. The processor 1025 may be, for example, a suitable digital microprocessor, and includes memory 1026, as well as typical clock, timing, and input/output capabilities (not separately represented). The processor can be programmed in accordance with a routine illustrated in conjunction with FIG. 11. The output of multiplexer 1020 is coupled, via a bandpass filter 1030, to a programmable gain amplifier 1033, the gain of which can be controlled by the processor 1025 via line 1033A. The output of amplifier 1033 is coupled to a rectifier 1035, a low-pass filter 1036, and then to an analog-to-digital converter 1037, the output of which is coupled to the processor 1025 via a buffer 1039 that is controlled by the processor. [This and other buffers can be part of the processor memory and control capability, as is known in the art.] The bandpass filter 1030 passes a band of frequencies around the center frequency transmitted by the transmitter toroidal coil 1011. The processor 1020 controls the multiplexer 1025 to select the different receiver outputs in sequence. The gain of programmable amplifier 1033 can be selected in accordance with the receiver being interrogated during a particular multiplexer time interval and/or in accordance with the received signal level to implement processing within a desired range. The amplified signal is then rectified, filtered, and converted to digital form for reading by the processor 1025.

In the present embodiment, the transmitter of subassembly 200 operates in two different modes. In a first mode, the transmitter toroidal coil 205 transmits measurement signals, and the signals received at the electrodes and the receiver toroidal coil are processed to obtain formation measurement information. In a second mode of operation, the transmitter toroidal coil 205 is utilized for communication with the transmitter/receiver in the surface/local communications subassembly 150 (FIG. 1).

A sinewave generator 1051, which may be under control of processor 1025 (line 1051A) is provided and has a frequency, for example, of the order of 100 Hz to 1M Hz, with the low kilohertz range being generally preferred. In an operating embodiment, the frequency is 1500 Hz. The generated sinewave is coupled to a modulator 1053 which operates, when the system is transmitting in a communications mode, to modulate the sinewave in accordance with an information signal from the processor 1025. The processor signal is coupled to modulator 1053 via buffer 1055.

In the present embodiment the modulator 1053 is a phase modulator, although it will be understood that any suitable type of modulation can be utilized. The output of modulator 1053 is coupled to a power amplifier 1060, which is under control of processor 1025 (line 1060A). The output of power amplifier 1060 is coupled, via electronic switch 1065, to the transmitter toroidal coil antenna 205. Also coupled to the toroidal coil antenna 205, via another branch of electronic switch 1065, is a demodulator 1070 which, in the present embodiment is a phase demodulator. The output of demodulator 1070 is coupled to the processor 1025 via buffer 1074. The processor controls electronic switch 1065, depending on whether the toroidal coil antenna 205 is to be in its usual transmitting mode, or, occasionally, in a receiving mode to receive control information from the surface/local communications subassembly 150.

Figure 11:
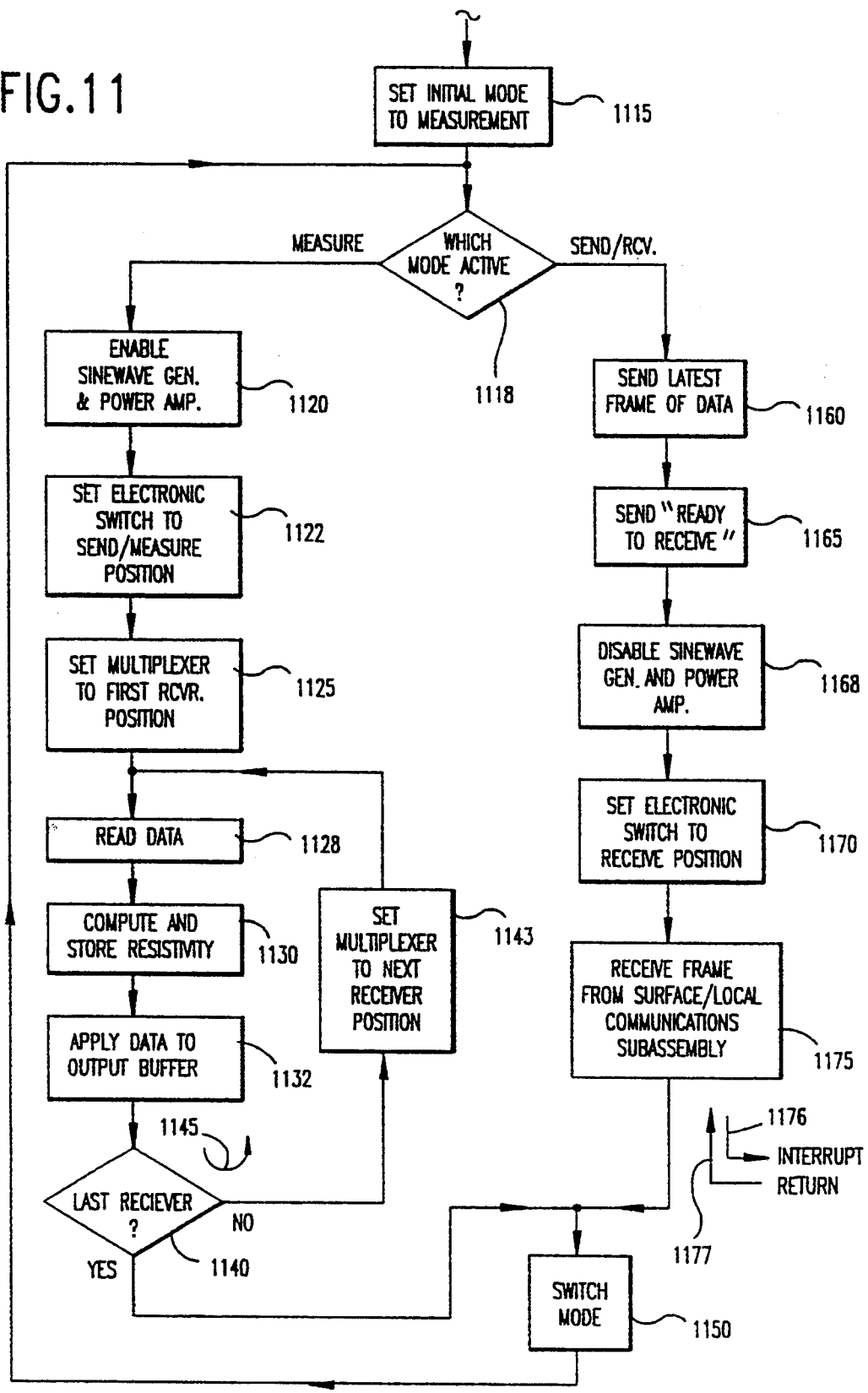
FIG. 11 is a flow diagram of an embodiment of a routine for programming the processor of the FIG. 10 embodiment.

Referring to FIG. 11, there is shown a flow diagram of a routine for programming the processor 1025 in accordance with an embodiment of the invention. In the example of the routine set forth, functions are performed or controlled in a repetitive sequential fashion. It will be understood, however, that the program may alternatively be set up with a routine that handles the indicated tasks on a prioritized basis, or with a combination of sequential and prioritized functions. Also, the processor may be multi-ported or multiple processors may be used. The routine hereof has two basic modes; a "measurement" mode wherein the toroidal coil antenna 205 is transmitting for the purpose of obtaining measurement signals at the receiving electrodes 226-228 and 235 and the receiving toroidal coil antenna 207, and a "local communications" mode wherein the toroidal coil antenna 205 is utilized to transmit and/or receive modulated information signals to and/or from a toroidal coil antenna located in the surface/local communications subassembly 150 (FIG. 1), for ultimate communication with equipment at the earth's surface via mud pulse telemetry equipment which is part of the subassembly 150. The block 1115 represents the initializing of the system to the measurement mode. Inquiry is then made (diamond 1118) as to which mode is active. Initially, as just set, the measurement mode will be active, and the block 1120 will be entered, this block representing the enabling of the sinewave generator 1051 and the power amplifier 1060 (FIG. 10). The electronic switch 1065 is then set to the measurement/send position (block 1122) [i.e., with the toroidal coil antenna 205 coupled to the power amplifier 1060], and the multiplexer 1020 is set to pass information from the first receiver (block 1125), for example the closest button electrode 226. The data is then read (block 1128) and the resistivity, as measured by the electrode from which the data has passed, is computed [for example in accordance with the relationships set forth above in conjunction with FIGS. 5-8] and stored (block 1130), and can be sent to output buffer 1055 (block 1132). Inquiry is then made (diamond 1140) as to whether the last receiver has been interrogated. If not, the multiplexer 1020 is set to pass the output of the next receiver (for example, the button electrode 227), as represented by the block 1143. The block 1128 is then re-entered, and the loop 1145 continues until data .has been obtained and processed from all receivers. When this is the case, the operating mode is switched (block 1150), and inquiry is made as to which mode is active. Assuming that the local communications mode is now active, the block 1160 is entered, this block representing the transmission of the latest frame of data to the main communications subassembly. In particular, data from the processor 1025 (or from the optional buffer 1055) is coupled to the modulator 1053 to modulate the sinewave output of generator 1051 for transmission by antenna 205. At the end of a frame of data, a "ready to receive" signal can be transmitted (block 1165). The sinewave generator and power amplifier are then disabled (block 1168), and the electronic switch 1065 is set to the "receive" position. [i.e., with the toroidal coil antenna 205 coupled to the demodulator 1070] (block 1170). A frame of information can then be received via buffer 1074, as represented by the block 1175. During this time, as represented by the arrows 1176 and 1177, other processor computations can be performed, as desired. The block 1150 can then be re-entered to switch the operating mode, and the cycle continues, as described. The information received from the surface/local communications subassembly can be utilized in any desired manner.

It will be understood that the routine set forth is illustrative, and other suitable routines will occur to those skilled in the art. Also, other suitable communications techniques can be employed, if desired. For example, simultaneous measurement and communication, such as at different frequencies, could be employed while still using a single transmitting antenna. Of course, local communication by wire conductor may be preferred in some situations, if available, and an output port 1029 (FIG. 10) can be provided for this purpose, or as a general read-out port.

Figure 12:
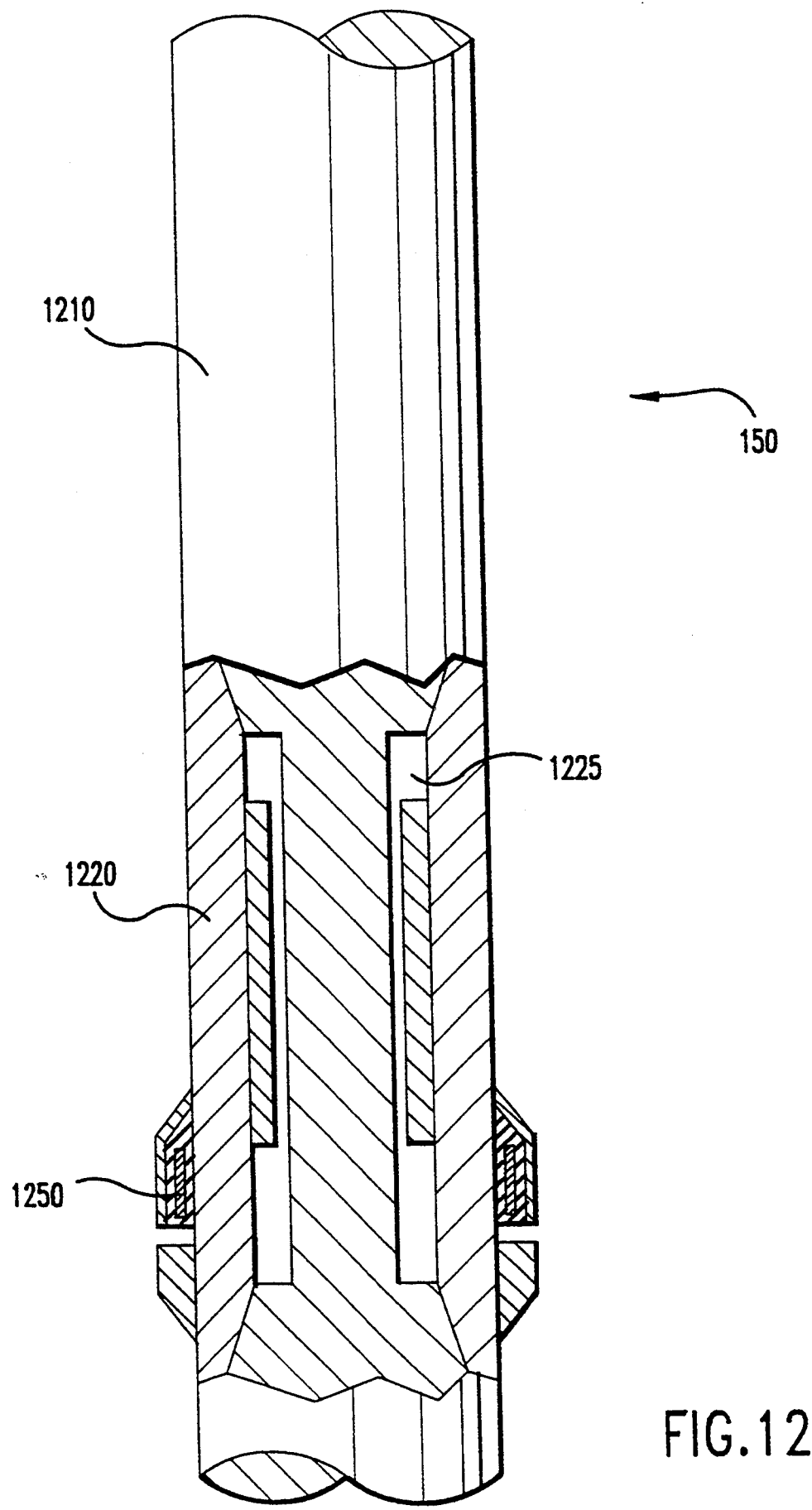
FIG. 12 is a diagram of the surface/local communications subassembly of the FIG. 1 bottom hole arrangement.

FIG. 12 illustrates an embodiment of the surface/local communication subassembly 150 of the FIG. 1 embodiment. As previously described, this subassembly can include a conventional type of mud communications equipment, including a mud transmitter (or mud siren), a mud receiver, and associated circuitry. This equipment, which is not, of itself, a novel feature of the present invention, is represented in FIG. 12 as being contained in a section of drill collar represented at 1210. Connected thereto, and housed in a section of drill collar 1220, is the local communications portion of the subassembly 150. In general, the collar 1220 is constructed in a manner similar to a portion of the measurement and local communications subassembly 200 as previously described, but the collar 1220 can be much shorter in length since only a single toroidal coil antenna, and no receiving electrodes, are utilized in the present embodiment. In particular, the collar 1220 has an inner annular chassis 1225 through which the drilling mud passes, and which has slots for circuit boards and batteries (not shown). The toroidal coil antenna 1250 can be constructed and mounted, in an insulating medium, in the manner previously described in conjunction with FIGS. 2 and 3, the coil again communicating with the electronics via a bulkhead connector (not shown).

Figure 13:
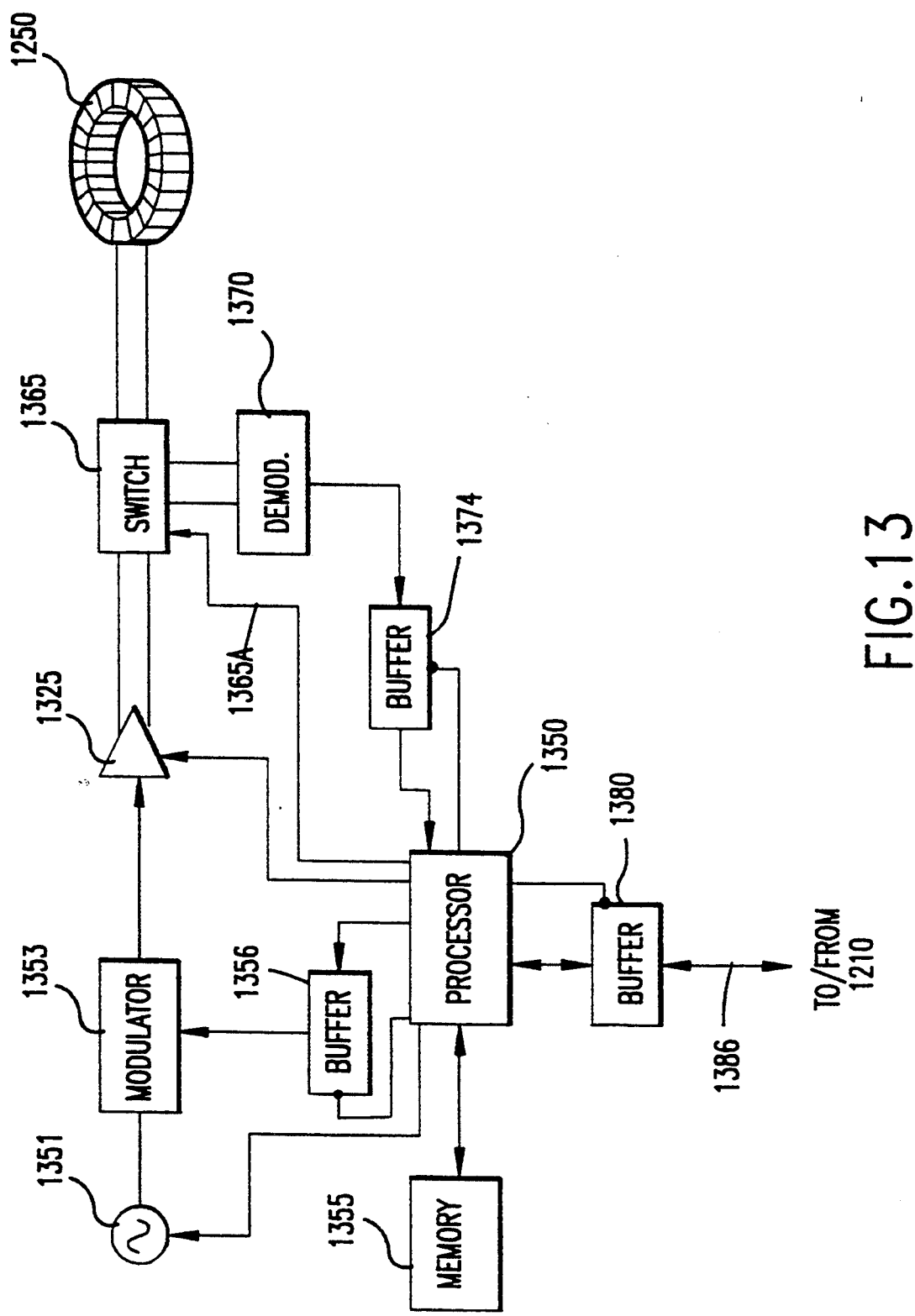
FIG. 13 is a block diagram, partially in schematic form, of the antenna and circuitry used in embodiment of the local communications portion of the surface/local communications subassembly of FIG. 12.

FIG. 13 illustrates an embodiment of the electronics in the local communications portion of surface/local communications subassembly 150. The electronics can be similar to the portion of the electronics utilized for local communication in the previously described measurement and local communications subassembly 200. In particular, the toroidal coil antenna 1250 is coupled, via electronic switch 1365, to a demodulator 1370 and to the output of a power amplifier 1325. The switch 1365 is under control (line 1365A) of a suitably equipped processor 1350, which includes memory 1355 and typical clock, timing, and input/output capabilities (not separately represented). A sinewave generator 1351 and a modulator 1353 are provided, as is buffer 1356, these units operating in a manner similar to their counterparts in FIG. 10. Also, as in the FIG. 10 embodiment, the output of demodulator 1370 is coupled, via buffer 1374, to the processor 1350. In the present embodiment, the processor 1350 is also coupled with the mud communications equipment (1210) via buffer 1380 and wiring 1386 that is coupled between the equipments 1210 and 1220. It will be understood that the equipments 1210 and 1220 (which comprise the subassembly 150) can be formed as a single unit within a single drill collar or housing, or can be separately formed, with provision for electrical coupling of the wiring at the interface. If desired, the circuitry for the two parts of the subassembly 150 can be shared; for example, a single processor or processor system could be utilized for the entire subassembly 150.

Figure 14:
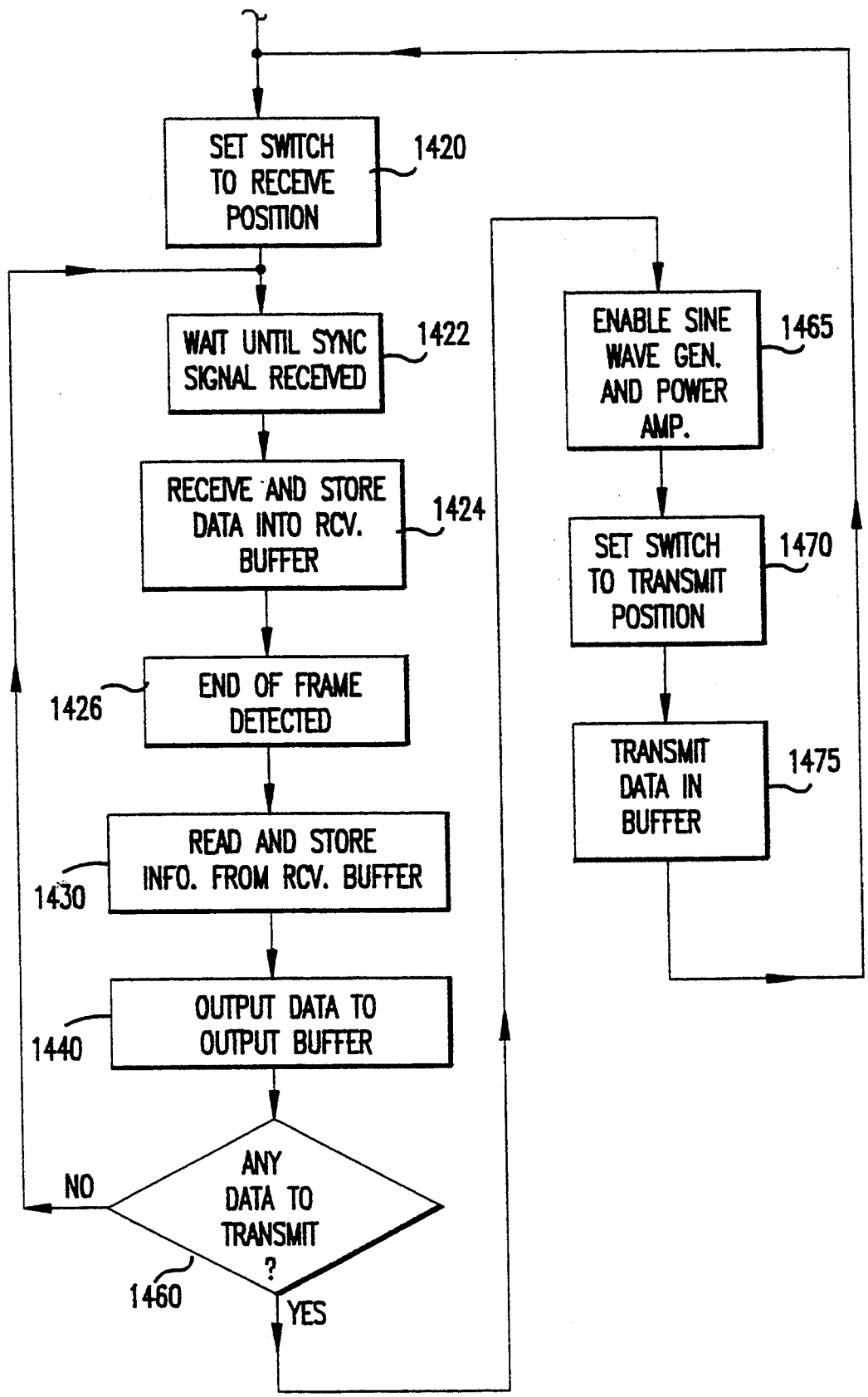
FIG. 14 is a flow diagram of an embodiment of a routine for programming the processor of the FIG. 13 embodiment.

Referring to FIG. 14, there is shown a flow diagram of an embodiment of a routine for programming the processor 1350 in accordance with a form of the invention. The block 1420 represents the setting of the electronic switch 1365 to its "receive" position. The block 1422 represents a processor state defined by waiting until a synchronization signal is recognized, at which point, the processor knows that information will follow. The data is then received and stored into a buffer (block 1424) continuously until an "end of frame" signal is recognized (block 1426). This signal indicates that the subassembly 200 is prepared to receive data and/or commands, if any. Block 1430 represents the reading and storage of data via the receiver buffer 1374. The data is then loaded into the output buffer 1380 (block 1440) which is coupled to the processor in the mud communications equipment of unit 1210. The mud telemetry may transmit fresh data or the previous data if no new data has arrived since the last mud telemetry frame was sent.

Inquiry is then made (block 1460) as to whether there is any information to transmit to the measurement and local communications subassembly 200. If not, block 1422 is re-entered. If data is to be transmitted, the sinewave generator is enabled (block 1465), the switch 1365 is set to its transmit position (block 1470), and the transmission of data is implemented (block 1475). When data transmission is complete, the switch 1365 is set back to the receive position (block 1420) and block 1422 is entered to wait for the next sync signal. As noted above with regard to the flow diagram of FIG. 11, various alternative techniques for implementing and controlling the processor can be employed.

Figure 15:
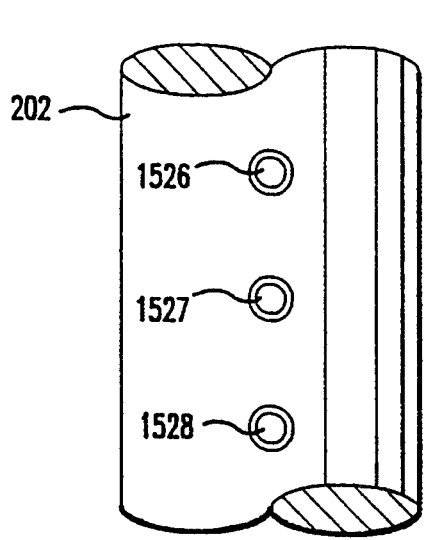
FIG. 15 is a diagram of another embodiment of the invention which utilizes electrodes mounted in a drill collar.

FIG. 15 illustrates an embodiment wherein electrodes such as button electrodes 1526, 1527 and 1528 are mounted in the drill collar 202 instead of in a stabilizer. In other respects, the structure of the electrodes the toroidal coil antennas, and their associated circuitry, can be as described above. This embodiment can be useful under conditions where use of a slick collar is indicated or beneficial.

The azimuthal resistivity obtained using the electrodes hereof can be correlated with the rotational orientation of the drill collar housing (or with respect to other reference) in various ways. For example, assume that the subassembly 130 (FIG. 1) of the bottom hole assembly includes conventional direction and inclination ("D and I") measuring equipment that provides the direction and inclination of the borehole and provides the rotational azimuth of the subassembly 130 with respect to magnetic north (known as "magnetic toolface") and with respect to the high side of the borehole (known as "gravitational toolface"). This equipment produces signals that can be coupled with the processor 1025, stored locally, and or communicated uphole for ultimate correlation, such as by using clock synchronization, of all acquired signals. If desired, azimuthal orientation can be obtained during rotation, for example by utilizing the approach described in the above referenced copending U.S. patent application Ser. No. 786,138 now U.S. Pat. No. 5,200,705. It will be understood that any suitable means can be employed for determining a azimuthal orientation.

The invention has been described with reference to particular preferred embodiments, but variations within the spirit and scope of the invention will occur to those skilled in the art. For example, it will be understood that other electrode configurations and/or toroidal coil antenna configurations could be employed. Also apparatus of the type described herein can be employed for obtaining measurements that can be utilized in determining formation dip characteristics, as described in the above referenced copending U.S. patent application Ser. No. 786,138 now U.S. Pat. No. 5,200,705.

We claim:

1. A measurement-while-drilling system for determining the resistivity of formations surrounding a borehole being drilled in the earth by a drill bit at the end of a drill string, comprising:
   a drill collar in said drill string, said drill collar comprising an elongated tubular body formed of an electrically conductive material;
   a toroidal antenna mounted on said body in an insulating medium, said antenna comprising a coil mounted on a toroidal core having an axis substantially coincident with the drill collar axis;
   means for energizing said toroidal antenna to induce a current which travels in a path that includes said body and said formations;
   a blade mounted on said body;
   an electrode mounted in said blade; and
   means for measuring at said electrode an electrical signal resulting from said current, said electrical signal being an indication of the resistivity of said formations.

2. The system as defined by claim 1, wherein said means for measuring an electrical signal comprises means for measuring the current flow in said electrode.

3. The system as defined by claim 2, wherein said means for measuring current flow in said electrode comprises means for measuring the magnitude of current flowing from said electrode to said body.

4. The system as defined by claim 2, wherein said blade comprises an electrically conductive blade, and wherein the surface of said electrode is electrically isolated from the surface of said blade.

5. The system as defined by claim 3, wherein said blade comprises an electrically conductive blade, and wherein the surface of said electrode is electrically isolated from the surface of said blade.

6. The system as defined by claim 2, wherein said electrode comprises a button electrode facing a wall of said borehole.

7. The system as defined by claim 6, wherein said button electrode is directly mounted as a stud in said body, and wherein said means for measuring the magnitude of current flow in said electrode comprises a coil encircling said stud and means for measuring current induced in said coil.

8. The system as defined by claim 6, wherein said electrode is coupled to said body via the primary winding of a transformer having primary and secondary windings, and wherein said means for measuring current flow in said electrode includes means for measuring current induced in said secondary winding.

9. The system as defined by claim 6, wherein said electrode has a vertical extent, in the direction of the borehole axis, of less than a small fraction of the vertical extent of said stabilizer blade.

10. The system as defined by claim 2, further comprising at least one further electrode mounted in said blade at a different spacing from said toroidal coil antenna than said first-mentioned electrode, and means for determining current flow in said at least one further electrode, to obtain a further indication of the resistivity of said formations.

11. The system as defined by claim 10, further comprising a ring-shaped electrode encircling the axis of said body and coupled to said body, the surface of said ring-shaped electrode being electrically isolated from the surface of said body, and means for measuring current flow from said ring-shaped electrode to said body.

12. The system as defined by claim 1, further comprising means for communicating said resistivity indication to the earth's surface.

13. The system as defined by claim 1, wherein said blade is a stabilizer blade.

14. A measurement-while-drilling system for determining a property of formations surrounding a borehole being drilled in the earth by a drill bit at the end of a drill string, comprising:
   a drill collar in said drill string, said drill collar comprising an elongated tubular body;
   a blade mounted on said body;
   an electrode mounted in said blade;
   means for generating an electronic signal; and
   means for measuring, at said electrode, a current resulting from said electronic signal, said current being an indication of a property of said formations.

15. The system as defined by claim 14, wherein said blade comprises an electrically conductive blade, and wherein the surface of said electrode is electrically isolated from the surface of said blade.

16. The system as defined by claim 15, wherein said electrode comprises a button electrode facing a wall of said borehole.

17. The system as defined by claim 16, wherein said electrode has a vertical extent, in the direction of the borehole axis, of less than a small fraction of the vertical extent of said stabilizer blade.

18. The system as defined by claim 15, wherein said property is resistivity.

19. The system as defined by claim 17, wherein said property is resistivity.

20. The system as defined by claim 18, further comprising means for communicating said resistivity indication to the earth's surface.

21. The system as defined by claim 14, wherein said blade is a stabilizer blade.

* * * * *